United States Patent [19]

Cordes

[11] 4,082,189

[45] Apr. 4, 1978

[54] APPARATUS FOR SEPARATING FOOD ARTICLES FROM FIELD DEBRIS

[75] Inventor: Henry P. Cordes, Vacaville, Calif.

[73] Assignee: Basic Vegetable Products, Inc., San Francisco, Calif.

[21] Appl. No.: 700,326

[22] Filed: Jun. 28, 1976

Related U.S. Application Data

[63] Continuation-in-part of Ser. No. 524,086, Sep. 15, 1974, abandoned.

[51] Int. Cl.² .............................................. B07C 5/342
[52] U.S. Cl. .................................. 209/73; 209/74 R; 209/111.6; 209/111.7 R; 250/223 R; 356/209
[58] Field of Search ............ 209/73, 74 R, 102, 111.5, 209/111.6, 111.7 R; 250/223 R, 239; 356/209; 198/817, 626; 171/126, 130

[56] References Cited

U.S. PATENT DOCUMENTS

| | | | |
|---|---|---|---|
| 2,827,645 | 3/1958 | Miller | 209/102 X |
| 3,034,645 | 5/1962 | Groppe | 209/74 R X |
| 3,435,950 | 4/1969 | Suverkrop | 209/73 |
| 3,450,887 | 6/1969 | Nirenberg | 250/561 |
| 3,455,444 | 7/1969 | Simmons | 209/111.7 T X |
| 3,773,172 | 11/1973 | McClure et al. | 209/111.6 X |

Primary Examiner—Robert B. Reeves
Assistant Examiner—Joseph J. Rolla
Attorney, Agent, or Firm—Thomas H. Olson

[57] ABSTRACT

Mobile apparatus movable over a crop bearing field such as a field in which onions or garlic are grown. The apparatus includes a pickup device for lifting the food product from the field surface onto a conveyer within the apparatus. Also included are devices which separate the food articles from an admixture of the articles with debris which is inevitably picked up during operation of the apparatus. On the apparatus is a transport conveyer that moves the articles in single file and spaced apart relation under a photoelectric cell. Responsive to the photoelectric cell is an air operated ejection device which ejects debris articles from the transporting conveyer but permits food articles to move to the end of such conveyer.

13 Claims, 8 Drawing Figures

APPARATUS FOR SEPARATING FOOD ARTICLES FROM FIELD DEBRIS

CROSS-REFERENCE TO RELATED APPLICATION

This is a continuation-in-part of U.S. application Ser. No. 524,086, filed Sept. 15, 1974, now abandoned.

BACKGROUND OF THE INVENTION

1. Field of the Invention:

This invention relates to apparatus for separating food articles from debris and more particularly to such apparatus that is movable over a field from which the food articles are picked.

2. Description of the Prior Art:

Separators employing color sensitive photoelectric cells have been known before the present invention. Articles to be sorted by such photoelectric cells are typically dropped through free space in front of the photo cell to assure that the photo cell sees only the articles to be sorted and not conveyers or like extraneous parts. To assure accuracy of sorting or separating apparatus employing the free fall principle, it is desirable if not essential that the apparatus be stationary in order to avoid accelerative forces on the free falling articles that might divert the articles from a path in alignment with the photo cell. Such apparatus cannot be employed in equipment that is moved over a field because such equipment would inevitably subject the free falling articles to random and unpredictable movements.

SUMMARY OF THE INVENTION

According to the present invention the food articles and the debris articles are constrained for movement over a fixed path which traverses a photoelectric cell. This mode of operation affords achievement of a principal object of the present invention which is to provide an efficient separating apparatus that can be moved over a field so as to return to the field dirt clods and like debris that are picked up with the food product.

Contributing to the achievement of the foregoing object is a transporting conveyer which is driven at a speed in excess of the conveyer that feeds it in order that each article to be detected, whether it be a food article or a debris article, is presented to the photoelectric cell singly. Because of the relatively greater speed of the transporting conveyor and the fast response time of the photoelectric cell, the sorting can be accomplished without interferring with the normal production rate of the equipment on which the sorting apparatus is installed.

Another object of the present invention is to provide a transporting conveyor that is optically neutral so that the photoelectric detecting facilities can be adjusted to distinguish between food articles and debris articles without attention to compensating for any conveyer surface characteristics. This object is achieved according to the present invention by providing a transport conveyer formed of two parallely spaced apart V-belts which define a slot therebetween having a width of less than the articles to be conveyed thereover but sufficient to exceed the optical field of the photoelectric detecting apparatus. Spaced on the side of the conveyer opposite from the photoelectric detector is a neutral background plate which has a flat nonreflective surface thereon and which is spaced remote from the focal point of the optics associated with the photoelectric detector. Accordingly in the absence of an article in alignment with the photoelectric cell, the photoelectric cell is not excited.

A feature and advantage of providing a transport conveyer that is centrally slotted is that a debris ejecting air jet can be formed through the slot. Not only does this contribute to compactness of the separating apparatus but permits the air jet to be accurately aimed so as to eject the debris articles from the path of transport of the food articles and into an independent path for disposal.

A further object is to provide an article transport conveyer that positively constrains articles in a fixed path as they are transported past a photo cell. This is important in mobile apparatus because of the vibration and movement caused during traverse of irregular field surfaces. The invention achieves this object by providing spaced apart pairs of V-belts which have the outer surfaces modified to define a trough having inward sloping article support surfaces. Moreover, the surfaces are provided with spaced apart protrusions which engage the articles even in the presence of substantial accelerative forces on the articles.

Because the photo cell detector can be used to drive electronic circuitry, which in turn actuates the air jet, the spacing of the air jet with respect to the photo cell is not critical. Thus a separating apparatus according to the present invention can be installed in numerous forms of existing equipment without substantial modification thereof.

Yet a further object of the invention is to provide a debris article ejector that is fast acting so as not to affect adversely the processing rate of the apparatus. In one form this object is achieved by providing an air tube aligned with the conveyer and a pneumatic system for directing a blast of air through the tube so as to eject a debris article from the path of transport of the articles. Another form of the invention employs a pivotally mounted arm and an actuator for pivoting the arm into the normal path of articles so as to deflect debris articles from such normal path.

The foregoing together with other objects, features and advantages will be more apparent after referring to the following specification and the accompanying drawings.

DESCRIPTION OF THE PREFERRED EMBODIMENT

Figure 1:
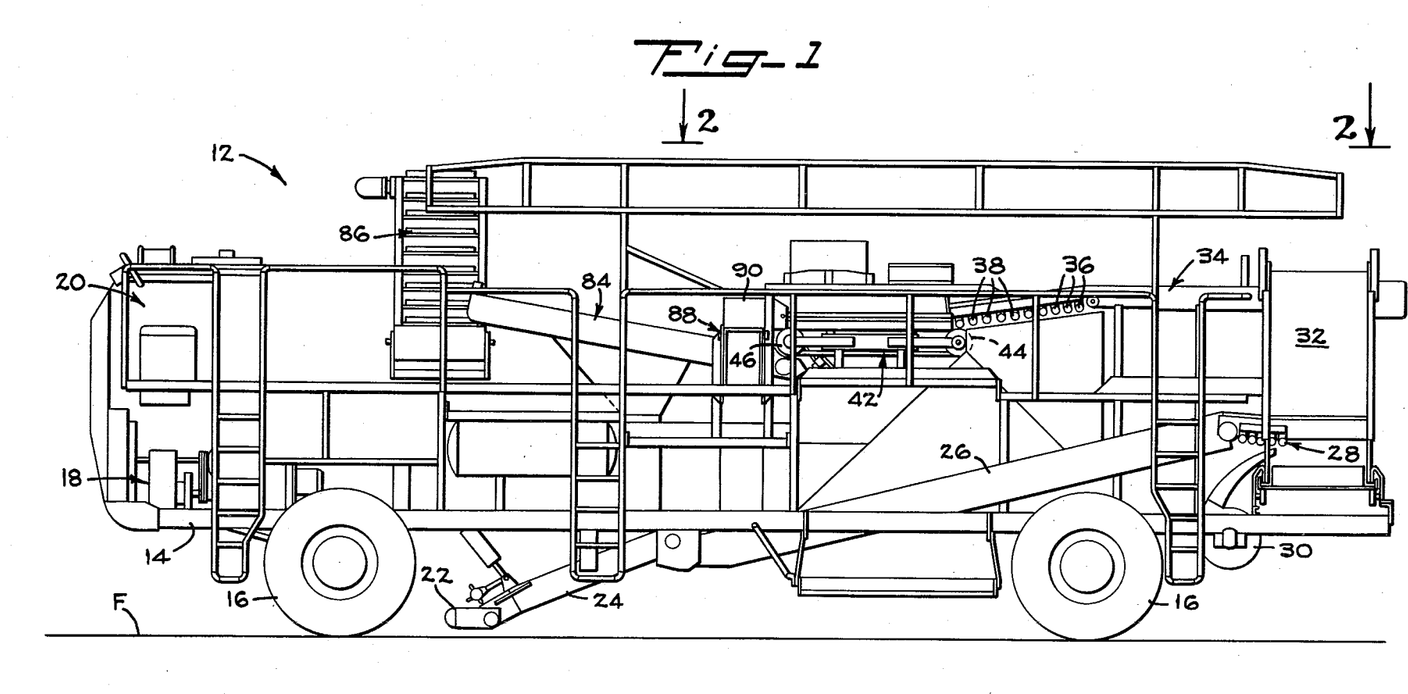
FIG. 1 is a side elevation view of garlic picking apparatus incorporating the present invention.

Referring more particularly to the drawings, reference numeral 12 indicates a garlic picker of more or less conventional construction which includes a frame 14 supported on wheels 16 for movement over a field surface F. Picker 12 includes a prime mover 18 and an operator's cab 20 which has controls (not shown) of conventional form for controlling movement of the picker over field surface F.

Near the forward end of picker 12 is an article pickup structure 22 of more or less conventional form that lifts food articles residing on the surface of the field up into the picker. The vertical position of article pickup structure 22 is adjustable in order to accommodate various field conditions. Included with the food articles such as garlic bulbs or the like are dirt clods and like debris. From the pickup structure 22 the articles are conveyed upward on a conveyer segment 24 from which the articles are deposited on an upward and rearward extending conveyer 26. Conveyer 26 includes a foraminous belt having openings which are large enough to permit small debris articles to fall therethrough back to the surface of field F but large enough to support the food articles and larger debris articles. The articles are then conveyed over a roller conveyer 28 and subjected to a fast moving airstream from a blower 30. Roller conveyer 28 tends to break up soft dirt clods and blower 30 blows lightweight debris rearward of the picker so that debris can fall on field surface F. The food articles and whatever debris remains are then elevated by a laterally extending upwardly inclined conveyer 32. Conveyer 32 discharges the articles, including food articles and debris articles, onto a horizontal conveyer surface 34 which collects the admixture of food articles and debris articles. Conveyer surface 34 moves toward the front of picker 12, in a leftward direction as viewed in the drawings. Conveyer 34 has substantial width so that the articles disposed thereon can be distributed across the width of the picker without substantial vertical buildup.

Disposed in article receiving relation to conveyer 34 is a series of ribbed rollers 36 which rotate in a direction such as to advance the articles in a leftward direction as viewed in the drawings. The ribbed rollers impart sufficient vibratory motion to the articles that the articles are distributed more or less uniformly across the width of the apparatus. In alignment with the conveying path afforded by ribbed roller 36 are singularizing rollers 38 which have ribs similar to rollers 36 and in addition have annular projections 40 which are spaced along the longitudinal axis of rollers 38. In one structure designed according to the present invention the annular projections are spaced at about 4 inch intervals. Accordingly, rollers 38 form the articles into a plurality of parallel paths, the paths being thirteen in number in the structure shown in FIG. 2. Because the articles in each of the singularized paths are treated in an identical fashion by identical structure, the description of only one such structure as given below will suffice.

Figures 4, 5:
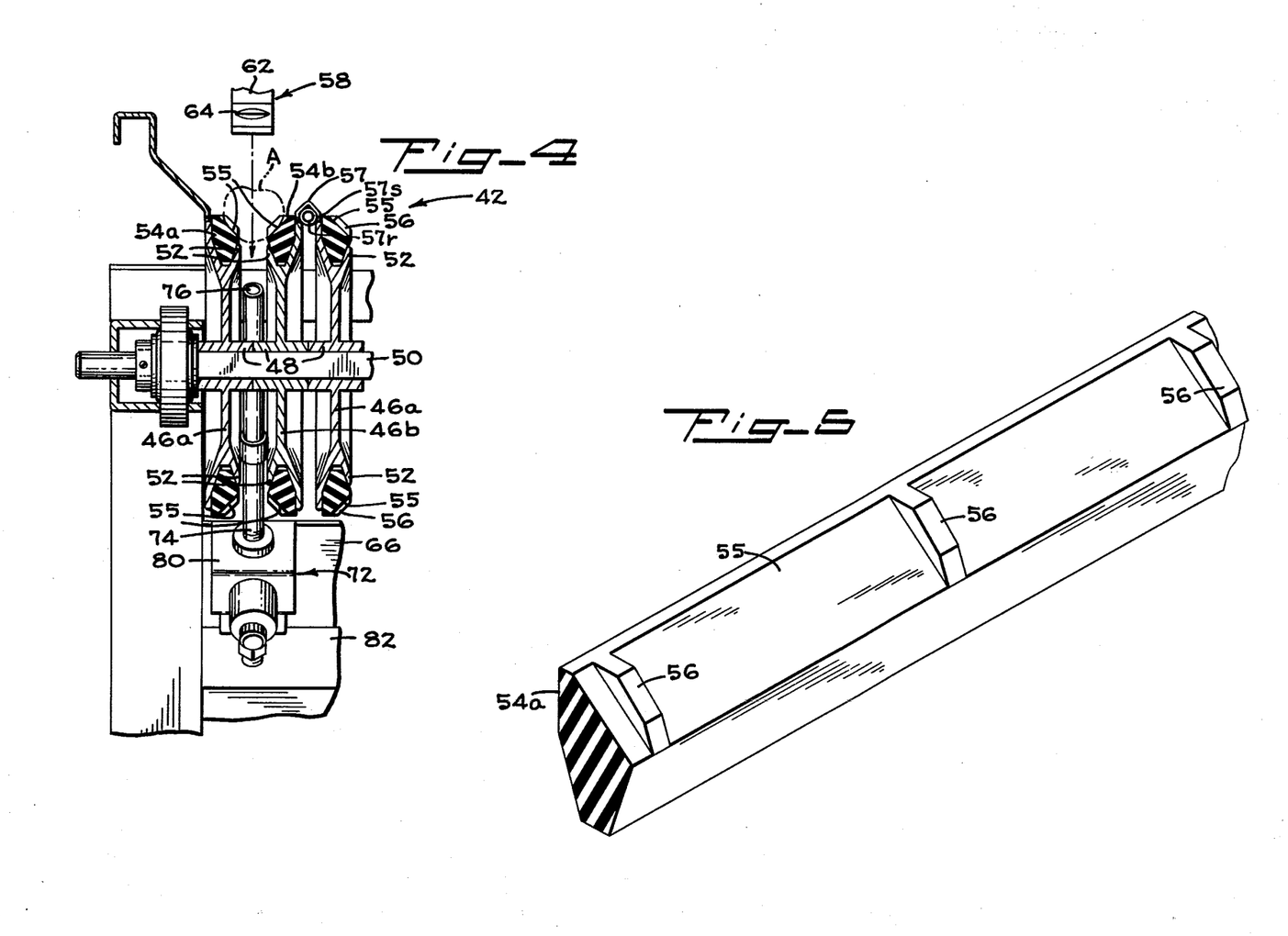
FIG. 4 is a cross-sectional view taken along line 4—4 of FIG. 3.
FIG. 5 is a fragmentary perspective view at enlarged scale of V-belt member that forms a part of the transport conveyer of the present invention.

Articles singularized by rollers 38 are deposited on a transport conveyer generally indicated at 42 which transport conveyer includes indentical pairs of upstream sheaves 44 and downstream sheaves 46. FIG. 4 indicates a typical pair of sheaves, there being a pair of sheaves 46a and 46b which are laterally spaced from one another by means of integral collars 48 which secure the sheaves for rotation with a shaft 50. The inner leg 52 of each of the sheaves is foreshortened so that articles A which are supported on V-belts 54a and 54b do not contact the steel or like material of which the sheave is made and are not bruised thereby. As seen most clearly in FIG. 4, the outer surfaces of the V-belts are formed with sloping article supporting surfaces 55 so that a generally V-shaped article supporting trough is formed. In one structure designed according to the present invention surfaces 55 are formed at an angle of about 45° to vertical so that the trough has an included angle of about 90°.

Because sheaves 46a and 46b and their counterparts at the opposite end of transport conveyer 42 are spaced from one another and because V-belts 54a and 54b are trained around such sheaves, a slot is defined between the V-belts which slot is in alignment with the center line of the paths defined between annular rings 40. The slot has a width less than the minimum dimension of articles A, a width of about one inch in one structure designed according to the present invention. Shaft 50 is rotated at a speed such that the lineal speed of the upper run of the V-belts moves at a speed in excess of speed of conveyance of the articles on singularizing rollers 38. In one apparatus designed according to the present invention V-belts 54a and 54b are adapted to travel at speeds up to 400 feet per minute, a speed of about 140–200 feet per minute being a desirable range of operation. The speed of advancement of articles over singularizing rollers 38 is less than the speed of the V-belt; for example, in the above mentioned specific apparatus designed in accordance with the invention, the speed of advancement of articles over singularizing rollers 38 is about half the speed at which V-belts 54a and 54b travel. The consequence of the relatively faster movement of V-belts 54a and 54b is that articles transported thereon are spaced apart to afford individual presentation to the optical system to be described in more detail hereinafter.

For maintaining the spaced apart relation of the articles the article supporting surfaces 55 of the V-belts can be equipped with spaced protrusions 56 (see FIG. 5) which are spaced along the V-belts at intervals of about four inches. Because of the relative high speed movement of the V-belts, a single article is supported on the leading edge of each protrusion 56.

Production equipment embodying the present invention employs a plurality of V-belt conveyers in parallel side-by-side relation. In such production equipment it is essential that an article be confined to one V-belt conveyer path and not protrude into adjacent paths. This is important in processing garlic bulbs, for example, because such bulbs have roots of sufficient length that they can span two or more conveyers unless corrective steps are taken. For confining the articles to only one V-belt conveyer, the present invention provides intermediate each adjacent pair of conveyers a fixed inverted V-shaped member 57 which extends above the upper surface of V-belts 54a and 54b. Because of the sloping side edges of the inverted V-shaped guide 57 and because of the forward movement of the articles on the conveyer, any protrusions or the like are moved into alignment with the center of the conveyer so that such protrusions do not extend into the path of the adjacent conveyer. V-shaped members 57 include integral vertically extending skirts or sides 57s which present a bearing surface against which the V-belts rub so that the V-belts are retained in the proper operative condition. For mounting the inverted V-shaped members 57 a rod 57r removably secured to the frame of the machine is provided, the inverted V-shaped member being fixed to the rod. The assembly composed of inverted V-shaped member 57 and rod 57r is removable for expediting cleaning of the apparatus as well as for replacement of the inverted V-shaped members when skirts 57s experience excessive wear.

Figure 2:
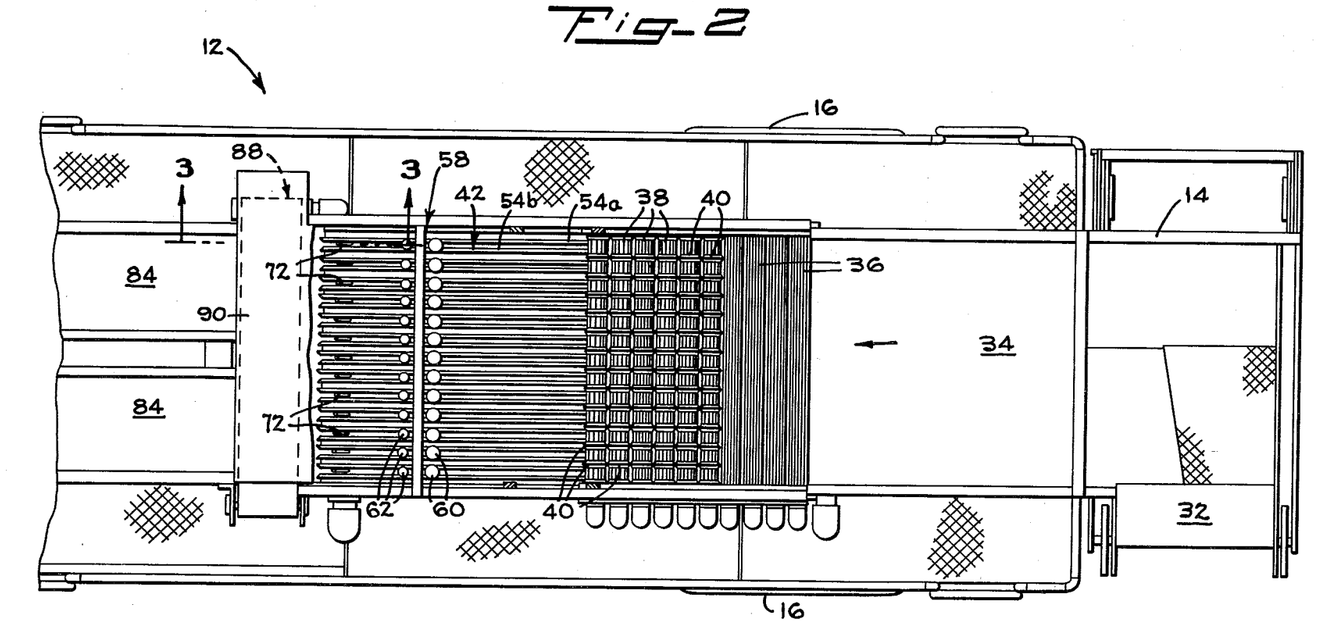
FIG. 2 is a fragmentary plan view taken along line 2—2 of FIG. 1.
Figure 3:
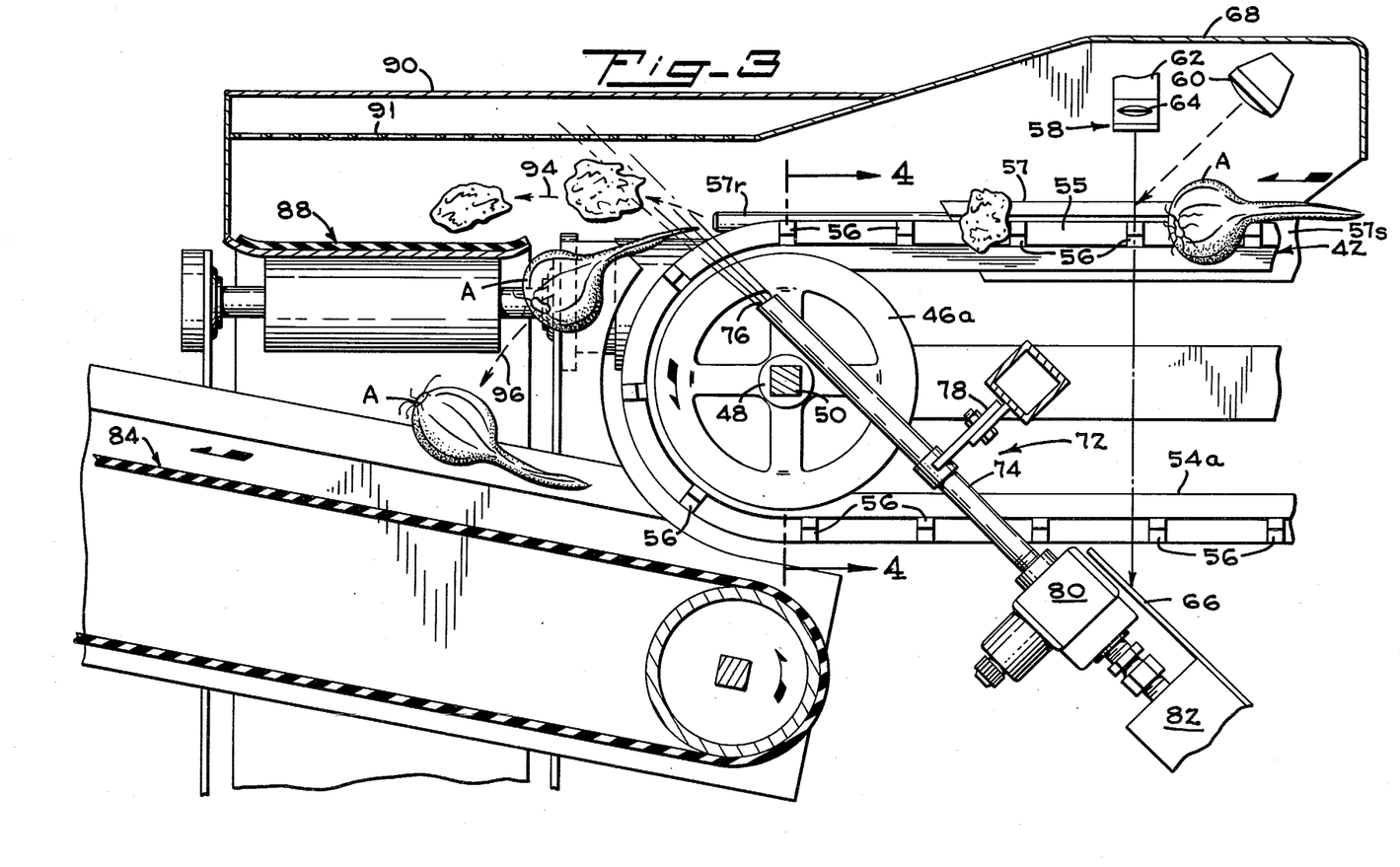
FIG. 3 is a fragmentary view at enlarged scale of the separating apparatus taken along line 3—3 of FIG. 2.

Intermediate the extremities of V-belts 54a and 54b is an optical system generally indicated at 58 in FIG. 2 for producing a control signal when debris articles transported on the V-belts pass thereunder. Referring to FIG. 3, optical system 58 includes a light source such as an incandescent lamp 60 that has a parabolic reflector or the like of conventional form for directing light energy onto articles A that are transported therepast by the V-belt conveyer. For receiving light that is reflected from lamp 60 by articles A there is a photoelectric cell 62 and an optical lens system 64 disposed about the articles. The optical axis of the lens system is in alignment with the slot between V-belts 54a and 54b. Lens system 64 is arranged so that the focal range is relatively narrow and is centered at or about the upper extremity of the V-belts so that photo cell 62 will react to light reflected from articles A but will not be excited in the absence of articles on conveyer A. Contributing to quiescence of photo cell 62 in the absence of an article on the V-belt conveyer is a background plate 66 in alignment with the optical axis of lens system 64 and the slot between the V-belts. Background plate 66 preferably has a flat black or like nonreflective surface finish and is inclined relative the optical axis of lens system 64 as shown in FIG. 3. The inclination of the background plate eliminates the possibility of light reflection back through lens system 64 to the photo cell and avoids buildup of debris on the background plate. Accordingly in the absence of articles on the V-belt conveyer, photo cell 62 sees an optically neutral background which does not activate the photo cell. In order that optical system 58 responds only to articles intersecting the optical path, an opaque housing 68 is provided to shield the system and the articles adjacent thereto from ambient sunlight. The presence of optical housing 68 affords uniformity of response in optical system 58 by assuring that photo cell 62 is excited only by light reflected by the articles from lamp 60 and not from ambient light, which can vary according to the time of day and to climatic conditions.

The constructional details of photo cell 62 and the electronic circuitry associated therewith form no part of the present invention. It is sufficient for the present invention to produce a signal in response to passage of a debris article thereunder. Among the known techniques for discriminating between a food article and a debris article are comparison of the magnitude of white light reflected by the respective articles, comparison of the wavelengths of light reflected by the respective articles, either in the visible or ultra violet range, and comparison of reflected signals that correspond to the moisture present in the articles, the amount of moisture in a dirt clod typically differing from the amount of moisture in a garlic or onion bulb. Suffice it to say for the present invention, the photo cell and the electronics associated therewith produces a signal in response to passage thereunder of a dirt clod but does not produce a signal when no article is in the optical path or when a food article is in the optical path.

Downstream of the site of optical system 58 is a device 72 that responds to the signal produced by the optical system for ejecting debris articles from the conveyer. Debris ejector 72 includes an air tube 74 that has an outlet 76 in alignment with a slot between V-belts 54a and 54b. As shown in FIG. 3 the tube is disposed at an oblique angle of about 45° so that the air jet produced thereby propels the articles in a corresponding direction. Tube 74 is secured to the machine frame by a bracket 78 and is supplied with compressed air through a solenoid operated air valve 80 which is adapted to deliver to the tube compressed air from a source 82. That is to say, when the solenoid valve 80 is caused to open, an air jet extending up through the space between the V-belts is produced so as to deflect articles from the normal path of food articles, the normal path being determined by the speed of movement of the transporting conveyer and the force of gravity on the food articles.

For receiving the food articles, which are not subjected to deflection by the air jet, there is a longitudinally extending discharge belt conveyer 84 which delivers the food articles to an elevating conveyer 86 from which the articles are dispensed into a bin or the like. Above conveyer 84 is a transversely running debris conveyer 88 which carries the debris laterally and deposits the same back onto field surface F. As can be seen in FIG. 3, debris conveyer 88 resides at about the same horizontal level as the V-belts and is spaced from the discharge end of the V-belt transport conveyer by a distance sufficient to permit food articles to fall via gravity onto discharge conveyer 84.

Opaque shield 68 has a forward extending impervious opaque extension 90 that is disposed above the discharge conveyer and air tube 74. Spaced below impervious extension 90 is a rigid foraminous plate 91 which in one structure designed according to the invention is expanded metal. Foraminous plate 91 permits air flow therethrough while deflecting onto debris conveyer 88 any light weight debris articles carried in the air blast from tube 74. This form of construction in combination with the periodic production of an air blast from tube 74 creates an air flow path from the interior of the opaque housing and laterally along the direction of movement of debris conveyer 88 for discharge from the side of picker 12. Such air flow is more or less continuous particularly in apparatus having plural air tubes 74 in juxtaposed relation; the more or less continuous air flow creates a venturi-like effect so that there is air movement from the inlet end of the opaque housing along the arrow shown in FIG. 3 and toward forward extension 90. The air flow avoids excessive dust in the area of optical system 58 so that the optical system responds accurately to the surface condition of the articles passing thereunder. More particularly, any dust created when the air blast from tube 74 impinges on debris articles will move with the above mentioned air flow along debris conveyer 88 rather than moving back toward the optical system 58. It will accordingly be appreciated that the opaque housing composed of element 68 and 90 cooperate to exclude ambient light from the optical system whereas foraminous plate 91 assists in establishing the laterally moving air streams so as to cause positive air flow past the optical system, thereby to prevent accumulation of dust at the site of the optical system.

In operation of the invention, picker 12 is moved over field surface F and an admixture of food articles and debris articles is picked up by pickup unit 22. The articles are transported and partially separated until they reach accumulator or collection conveyer 34. Movement over ribbed rollers 36 distributes the articles more or less uniformly across the width of the apparatus and the articles are formed into a plurality of columns by singularizing rollers 38. Each of the columns is deposited onto a transport conveyer 42; because the transport conveyer travels at a speed substantially greater than the speed of travel over the singularizing rollers, the articles are in spaced apart relation on the transport conveyer. The presence of protrusions 56 on the V-belts assists in conveying the articles in single, spaced apart relation past optical system 58. As the articles move under opaque housing 68 they are illuminated by the light from lamp 60 which light is reflected by the articles through optical lens system 64 to photo cell 62. The photo cell and its associated electronic circuitry are arranged to produce a signal when a debris article such as a dirt clod is seen by the photo cell but to refrain from producing a signal at all other times. When a signal is produced by photo cell 62, solenoid operated air valve 80 is opned and a jet of air is delivered to outlet 76 through tube 74. There is a delay between production of the signal by photo cell 62 and production of the air blast because a finite time is required for transport of the debris article. Such delay is conveniently achieved by the electronic circuitry associated with the photo cell. In any event, when the debris article reaches a point in approximate alignment with tube 74, solenoid 80 is opened so that the dirt clods are given an upward component of force whereby they follow a path indicated by broken lines 94 in FIG. 3 to debris conveyer 88. When photo cell 62 fails to produce a signal, as it does when the food article A moves therepast, solenoid valve 80 is not actuated whereupon the food articles come under the influence of the force of gravity and traverse a path 96 onto discharge conveyer 84.

Figure 6:
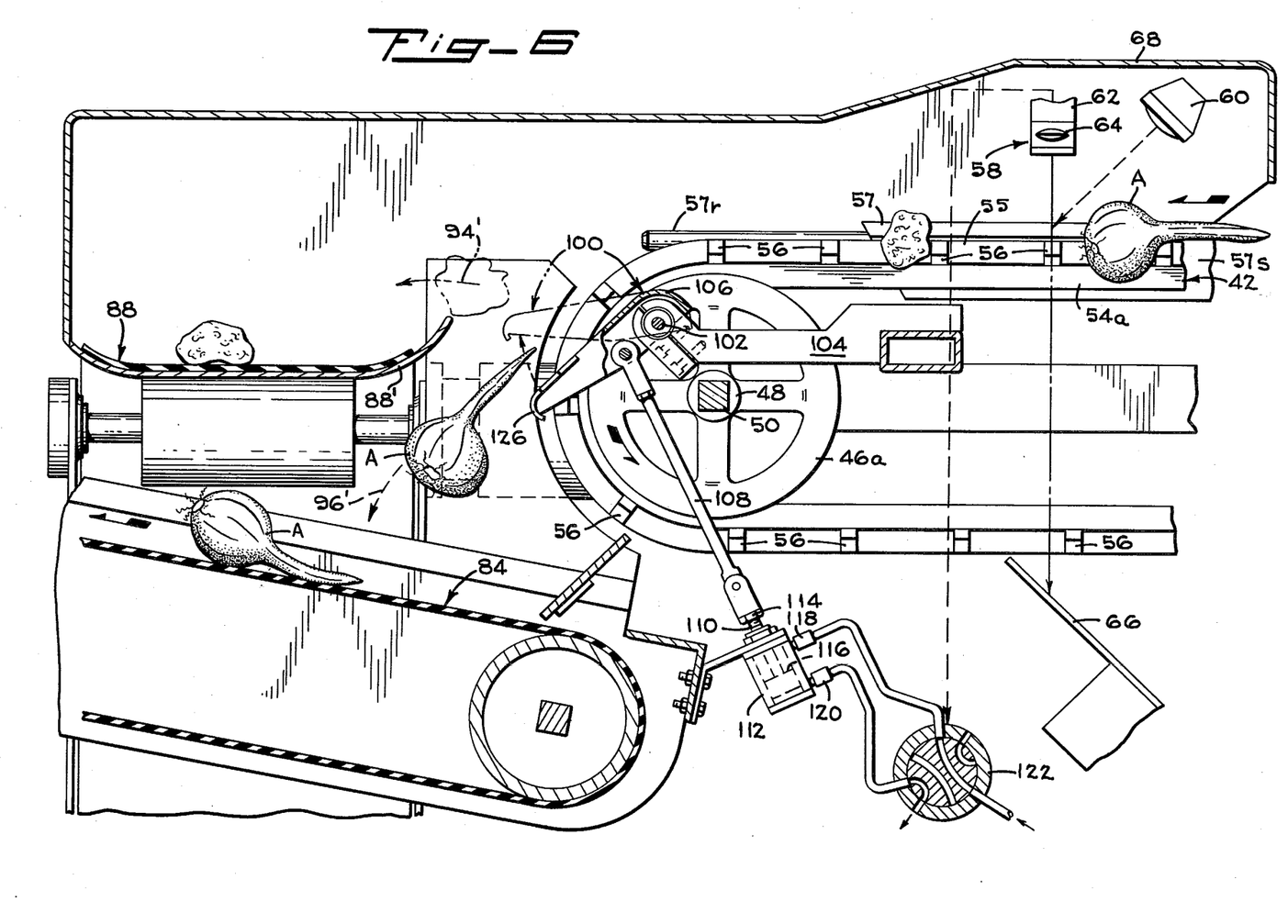
FIG. 6 is a view similar to FIG. 3 showing an alternate form of debris article ejecting apparatus.
Figure 7:
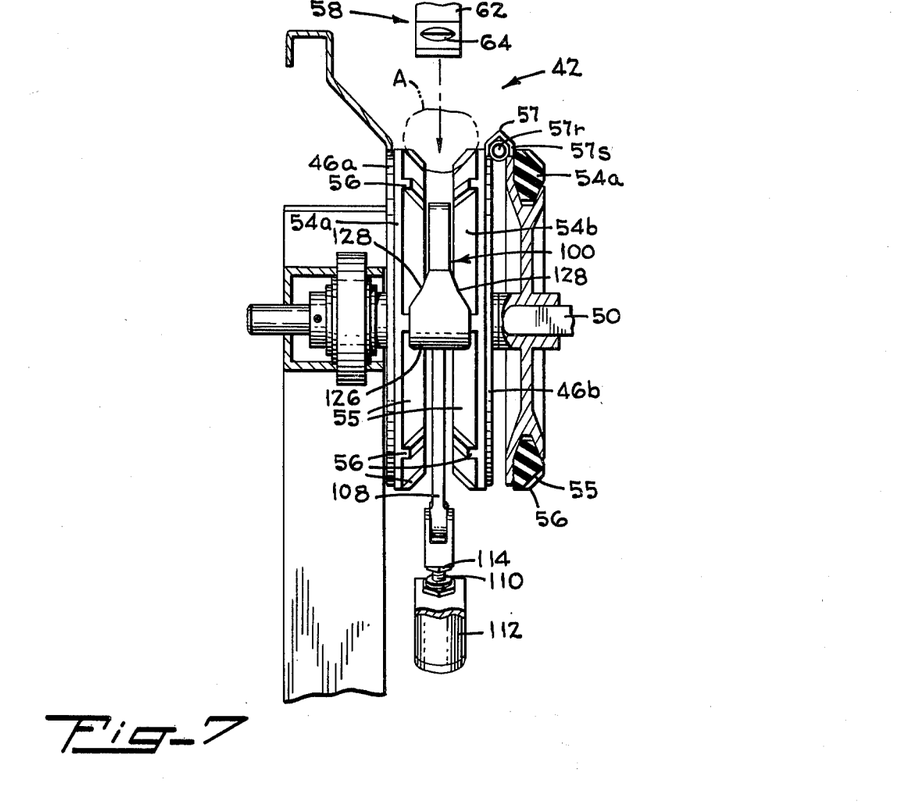
FIG. 7 is a fragmentary view in transverse cross section taken from a point downstream of the article conveyer of FIG. 6 and looking in an upstream direction.
Figure 8:
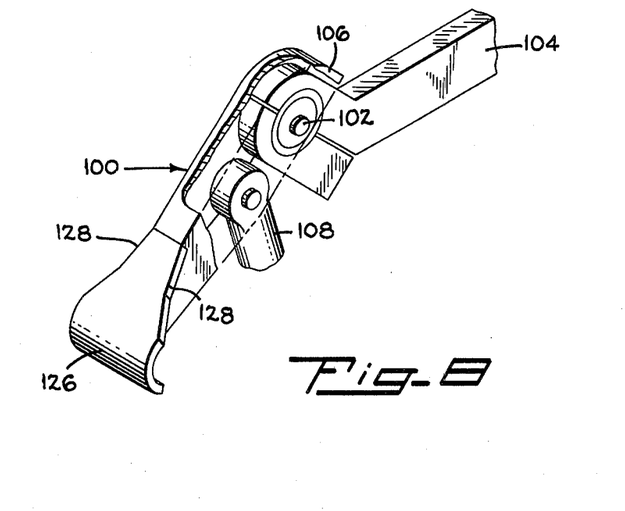
FIG. 8 is a perspective view of a modified form of debris article ejector, portions being broken away to reveal internal details.

The alternate form of the invention shown in FIGS. 6-8 includes many elements common to those previously described; such elements in the alternate form of FIGS. 6-8 bear the same reference numerals as heretofore employed where appropriate. Thus the alternate embodiment includes an optical system 58 which has a light source 60 and a photo cell 62 onto which light reflected from a debris article on a transport conveyer 42 is focused by a lens system 64. Accordingly as the articles are transported past the optical system, an electric signal indicating the presence of a debris article is produced, which signal is used to activate the debris article ejector equipment.

The alternate form of debris article ejection means includes an ejector arm 100 which has an inner end mounted on a pivot pin 102 which pivot pin is carried on a fixed arm 104 disposed intermediate V-belts 54a and 54b. As can be seen most clearly in FIG. 6, the axis of pivot shaft 102 is below the path which the articles on transport conveyer 42 traverse. Ejector arm 100 is of hollow construction at the inner end thereof (see FIG. 8), there being a hollow cavity defined by a wall 106 for enclosing pivot shaft 102 to exclude dirt and the like therefrom. Also within the cavity and pinned to wall 106 is the upper end of an actuating rod 108, the lower end of which is connected to a piston rod 110 of a double acting pneumatic actuator 112. A turnbuckle coupling 114 is employed to secure actuating rod 108 to piston rod 110 in order to afford a degree of adjustability. Within actuator 112 is a piston 116 to which piston rod 110 is connected, there being an upper air connection 118 and a lower air connection 120. In the position shown in FIG. 6, air is supplied through upper connection 118, and lower connection 120 is open to the atmosphere, thereby moving ejector arm 100 to its lower or retracted position. Air connections 118 and 120 are connected to a four-way air valve schematically indicated at 122, which air valve is operatively linked to optical system 58 so that air is supplied to connection 120 in response to detection by the optical system of a debris article on transport conveyer 42.

Referring to FIG. 8, ejector arm 100 has at the distal end thereof remote from pivot pin 102 a relatively large deflector plate 126 which has inward tapering side edges 128 forming a V-shaped configuration. Such configuration permits the ejector arm to reside within the V-groove formed between belts 54a and 54b at a retracted position shown in solid lines in FIG. 6. In such position deflector plate 126 is below the path traversed by food articles A as they travel from the outlet of conveyer 42 onto discharge belt conveyer 84. Even should a relatively heavy article drop to the level of the deflector 126, the travel of the article to conveyor 84 is not impeded, because of the smooth curved outer surface of the deflector plate.

When a debris article traversing transport conveyor 42 is detected by optical system 58, however, valve 122 is operated in response to which air is supplied to lower connection 120 of actuator 112 in consequence of which ejector arm 100 moves upward about the axis of pivot pin 102 to the position shown in broken lines in FIG. 6. In this position, the deflector plate 126 resides in the normal path of trajectory of articles from the outlet end of transport conveyor 42 to discharge conveyer 84 and deflects those articles onto debris conveyor 88. A conventional delay circuit can be employed between optical system 58 and valve 122 to effect precise timing between upward pivotal movement of ejector arm 100 and the advancement of a debris article along transport conveyor 42 so that the debris article is impacted by deflector plate 126 to direct the debris article along path 94' to debris conveyor 88. A rigid plate 88' underlies the upper run of debris conveyer to constrain the run in a desired path; plate 88' is adjustably mounted so that the debris conveyer can be properly positioned relative the outlet end of transport conveyer 42 to assure proper operation for all speeds of the transport conveyer.

Because of the relatively high speed at which transport conveyer 42 advances articles toward the left as viewed in FIG. 6, the ejector arm 100 must be of relatively light weight so it can be rapidly moved between its two extremes. The hollow construction of the deflector arm contributes to achievement of this desideratum as does the fact that the deflector arm is typically constructed of aluminum or like weight material. For example, in one system designed in accordance with the modification of FIGS. 6-8 the travel of piston 116 in actuator 112 is approximately 1 inch and only about seven millisecond (0.007 seconds) are required to move the ejector arm upward and to return it to the retracted position shown in solid lines in FIG. 6. In such exemplary design, a debris article that is separated from a food article by only ½ inch can be ejected expeditiously.

The modification shown in FIGS. 6-8 has the advantage, since the compressed air is confined within actuator 112, of requiring a much smaller volume of air and much less dust, important considerations in certain environments. Thus the modification shown in FIGS. 6-8 contributes to achieving the salutary advantages of this invention.

Because the optical path of lens system 64 is in alignment with the slot between the articles, the photo cell can be adjusted to provide accurate discrimination between wanted and unwanted articles. Such is the case because in the absence of an article on conveyer 42 and the limited range of focus of lens 64, the photo cell sees a neutral background. The presence of background plate 66 in alignment with the optical path assures avoidance of spurious reflected light which might otherwise produce false signals to the photo cell.

Thus it will be seen that the present invention provides an extremely accurate and versatile separating mechanism which can be mounted on mobile apparatus because the articles presented to the optical system are positively constrained for movement along a constant path. Because the connection between the photo cell and the air operated ejector is through conventional electronic circuitry the separator can be conveniently adapted to existing equipment without substantial modification thereto.

Although one embodiment of the invention has been shown and described it will be obvious that other adaptations and modifications can be made without departing from the true spirit and scope of the invention.

What is claimed is:

1. Apparatus for separating food articles having a first color from an admixture of said food articles with debris articles such as dirt clods and the like which have a second color different from said first color, said apparatus comprising singularizing means for forming said articles into a single file column, said singularizing means having a discharge end, transporting means in aligned receiving relation to the discharge end of said singularizing means, said transporting means operating to transport said articles at a speed in excess of said singularizing means so that said articles on said transporting means are in spaced apart relation thereon, photoelectric means disposed adjacent said transporting means for producing a signal in response to transportation of debris articles therepast, said photoelectric means including a photo cell, a lens system having an optical axis aligned with said photo cell and said transporting means, means on the same side of said transporting means as said photo cell for illuminating articles on said transporting means as the articles intersect the optical axis, said transporting means defining a slot in alignment with said optical axis so that said transporting means does not reflect light from said illuminating means along said optical axis, means defining a nonreflective surface in said optical axis on the side of said transporting means opposite said illuminating means, an opaque housing surrounding said photoelectric means and said transporting means adjacent thereto for shielding said photo cell from ambient light so that said photo cell responds only to light from said illuminating means reflected from articles on said transporting means, and means responsive to said signal for ejecting said debris articles on said transporting means upward from said transporting means.

2. Apparatus according to claim 1 wherein said nonreflective surface defining means includes a background plate aligned with the optical axis and disposed on the side of said transporting means opposite said lens system, said background plate having a nonreflective surface and being inclined relative said optical axis to avoid reflection therefrom along the optical axis.

3. Apparatus according to claim 1 wherein said ejecting means comprises an air tube oriented to produce an air blast directed in an upward forward direction, said housing extending adjacent said tube to form a substantially airtight chamber around said tube and said transporting means, there being an air outlet from said chamber remote from said tube and said photoelectric means for affording an airstream through said outlet, said airstream inducing an airflow past said photo cell.

4. Apparatus according to claim 1 wherein said transporting means has an outlet end formed by at least one sheave for constraining said transporting means in an arcuate downward moving path so that food articles exit said transporting means along a trajectory path, the configuration of such trajectory path being dictated by the combined momentum of an article on said transporting means and the force of gravity acting on the article, and wherein said ejecting means includes deflecting means active on an article in said trajectory path to deflect debris articles upward and outward from said trajectory path.

5. Apparatus according to claim 4 wherein said deflecting means comprises an air tube disposed below said trajectory path and oriented in an oblique position sloped downstream of said transporting means and means for supplying an air blast to said air tube to deflect debris articles upward of said trajectory path.

6. Apparatus according to claim 4 wherein said deflecting means comprises an arm having an inner end pivotally mounted below said trajectory path, said arm having a distal end remote from said inner end and a length such that said arm is pivotable between a lower retracted position at which said distal end is below said trajectory path and upper extended position at which said distal end lies in the trajectory path to deflect articles therefrom, and means responsive to detection of a debris article by said photoelectric means for pivoting said arm to the extended position to deflect the debris article from said trajectory path.

7. Apparatus according to claim 6 wherein said arm pivoting means comprises a pneumatic actuator having a rod reciprocable in response to application of compressed air to said actuator, means for attaching said rod to said arm intermediate the ends thereof, and means for supplying compressed air to said actuator in response to detection of a debris article by said photoelectric means.

8. Apparatus according to claim 1 wherein said transporting means includes first and second V-belts supported in parallel relation and being spaced apart to define a slot having a width less than the diameter of said articles, said V-belts having first ends adjacent said discharge end and disposed in article receiving relation thereto, means for actuating said V-belts to transport articles from said first ends therealong in a direction away from said first ends, said photoelectric means being disposed in alignment with said slot, said V-belts having sloping article supporting surfaces which define a V-shaped article supporting trough therebetween, said transporting means including right and left inverted V-shaped members, means for supporting respective said members on respective sides of said transporting means in parallelism therewith, said inverted V-shaped members defining sloping surfaces above and laterally spaced from said article supporting surfaces on respective said V-belts for confining articles to said transporting means.

9. Apparatus according to claim 8 wherein each said inverted V-shaped member includes an integral skirt portion depending therefrom and defining a vertical surface, said vertical surface bearing against respective said V-belt in rubbing contact therewith for retaining said V-belt in proper operative condition in the path of said transporting means.

10. Apparatus for separating food articles having a first color from an admixture of said food articles with debris articles such as dirt clods and the like which have a second color different from said first color, said apparatus comprising means for conveying the admixture to a collection conveyer having a discharge end, a plurality of parallel singularizing conveyers disposed in receiving relation to said discharge end for forming a plurality of columns of articles, an equal plurality of transporting means in aligned receiving relation to respective said singularizing conveyers, said transporting means operating to transport said articles in a generally horizontal direction at a speed in excess of said singularizing conveyers so that said articles on said transporting means are in spaced apart relation thereon, said transporting means including first and second V-belts supported in spaced apart relation to define a slot therebetween, said V-belts having sloping article supporting surfaces which define a V-shaped article supporting trough therebetween, a plurality of uniformly spaced apart protrusions protruding from said sloping V-belt surfaces for engaging articles thereon and constraining said articles for single spaced apart movement on said transporting means, means for illuminating articles on said transporting means, photoelectric means responsive to light reflected by debris articles from said illuminating means, a lens system having an optical axis in alignment with said photoelectric means and said slot so that in absence of an article on said transport means no light is reflected from said illuminating means to said photo cell, an air tube downstream of said photo cell, said air tube being disposed below said transport means in alignment with said slot so as to produce an upward and forward directed air blast, means for supplying a compressed air pulse to said air tube in response to excitation of said photo cell by passage of a debris article, said air pulse supplying means being delayed to provide time for transport of a debris article from said optical axis to said air tube so that the debris article is ejected from said transporting means along a path, and means spaced from said transport means and in the path of ejected debris articles for conveying said debris articles away from said transport means.

11. Apparatus for separating food articles having a first color from an admixture of said food articles with debris articles such as dirt clods and the like which have a second color different from said first color, said apparatus comprising singularizing means for forming said articles into a single file column, said singularizing means having a discharge end, transporting means in aligned receiving relation to the discharge end of said singularizing means, said transporting means operating to transport said articles at a speed in excess of said singularizing means so that said articles on said transporting means are in spaced apart relation thereon, photoelectric means for producing a signal in response to transportation of a debris article therepast on said transporting means, said photoelectric means including a photo cell, a lens system having an optical axis aligned with said photo cell and said transporting means, and means for illuminating articles on said transporting means as the articles intersect the optical axis, said transporting means defining a slot in alignment with said optical axis so that said transporting means does not reflect light from said illuminating means along said optical axis, a background plate aligned with the optical axis and disposed on the side of said transporting means opposite said lens system, said background plate having a non-reflective surface and being inclined relative said optical axis to avoid reflection therefrom along the optical axis, and means responsive to said signal for ejecting said debris articles from said transporting means.

12. Apparatus according to claim 11 including an opaque housing surrounding said photoelectric means for shielding said photo cell from ambient light so that said photo cell responds only to light from said illuminating means, said ejecting means being disposed within said opaque housing and comprising an air tube oriented to produce an air blast directed in an upward forward direction, said housing extending adjacent said tube to form a substantially airtight chamber around said tube and said transporting means, there being an air outlet from said chamber remote from said tube and said photoelectric means for affording an airstream through said outlet, said airstream inducing an air flow past said photo cell.

13. Apparatus for separating food articles having a first color from an admixture of said food articles with debris articles such as dirt clods and the like which have a second color different from said first color, said apparatus comprising singularizing means for forming said articles into a single file column, said singularizing means having a discharge end, transporting means in aligned receiving relation to the discharge end of said singularizing means, said transporting means operating to transport said articles at a speed in excess of said singularizing means so that said articles on said transporting means are in single file spaced apart relation thereon, said transporting means defining a slot therealong, photoelectric means disposed adjacent said transporting means and said slot for producing a signal in response to transportation of debris articles therepast, a tube supported below said transporting means in alignment with said slot, means for controllably supplying a compressed air pulse to said tube to generate an air blast on a debris article on said transporting means, said tube being oriented obliquely of vertical in the direction of forward movement of said transporting means so that said air blast causes a debris article to traverse a path upward and forward of said transporting means, an air impervious housing overlying said tube and said photoelectric means and having an outlet in alignment with said tube for affording passage of debris articles along said path, said housing having an inlet adjacent said photoelectric means so that in response to an air blast from said tube air flow through said inlet past said photoelectric means is induced, said transporting means terminating immediately downstream of said tube at an outlet so as to permit food articles to fall via gravity from said transporting means, a food article discharger conveyor downstream of and below said outlet for conveying food articles away from said transporting means, means responsive to said signal for actuating said compressed air pulse supplying means, and debris conveyor means in said path for receiving said debris articles ejected from said transporting means, said debris conveyor means being spaced from said outlet of said transporting means and above said food article discharge conveyor to afford uninhibited passage of said food articles on said transporting means.

* * * * *